C. HENNESSEE.
GUANO DISTRIBUTER AND GRAIN DRILL.
APPLICATION FILED JAN. 14, 1915.

1,140,266.

Patented May 18, 1915.
2 SHEETS—SHEET 1.

Witnesses

Inventor
Claude Hennessee
By
Attorney

C. HENNESSEE.
GUANO DISTRIBUTER AND GRAIN DRILL.
APPLICATION FILED JAN. 14, 1915.

Patented May 18, 1915.

Witnesses

Inventor
Claude Hennessee
By
Attorney

UNITED STATES PATENT OFFICE.

CLAUDE HENNESSEE, OF TIFTON, GEORGIA.

GUANO-DISTRIBUTER AND GRAIN-DRILL.

1,140,266.  Specification of Letters Patent.  Patented May 18, 1915.

Application filed January 14, 1915. Serial No. 2,169.

*To all whom it may concern:*

Be it known that I, CLAUDE HENNESSEE, a citizen of the United States, residing at Tifton, in the county of Tift and State of Georgia, have invented certain new and useful Improvements in Guano-Distributers and Grain-Drills; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in guano distributers and grain drills and the object in view is to produce a simple and efficient apparatus of this nature having means whereby the vibratory movement imparted to the hopper may be regulated and in the provision of means whereby, when the apparatus is moved backward, it will be automatically thrown out of operative relation.

The invention consists further in various details of construction, combinations and arrangements of parts which will be hereinafter fully described, shown in the accompanying drawings and then specifically defined in the appended claim.

Figure 1:
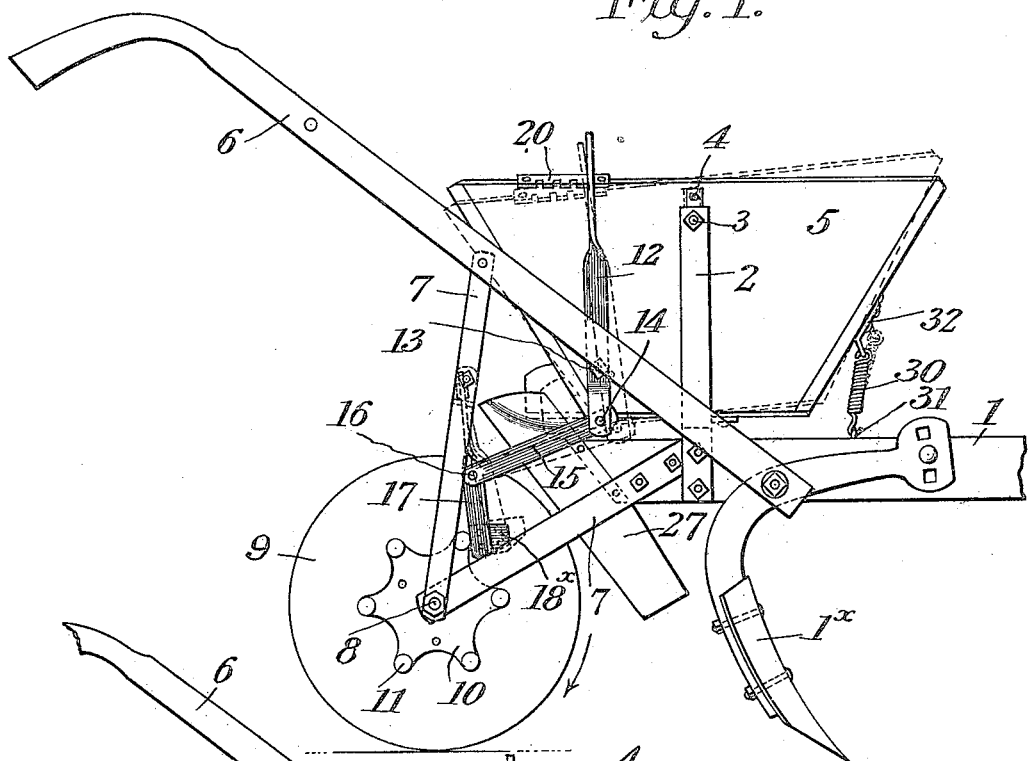
Figure 2:
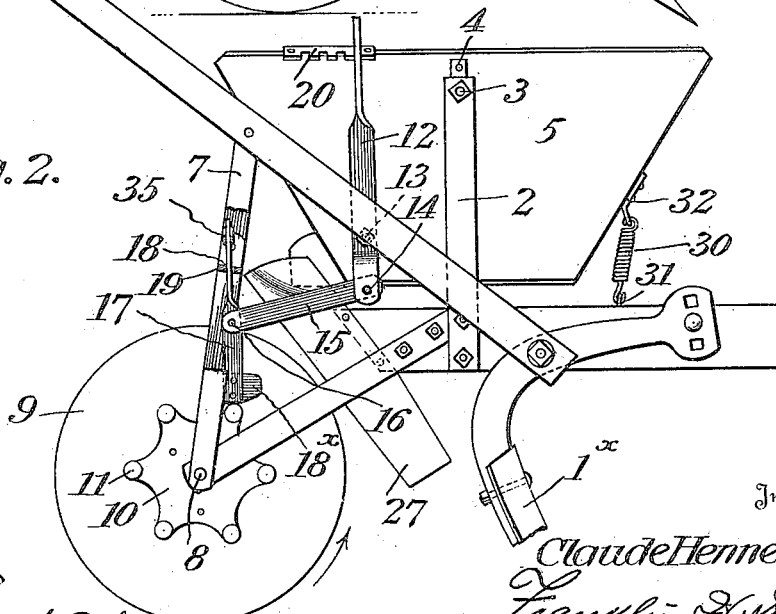
Figure 3:
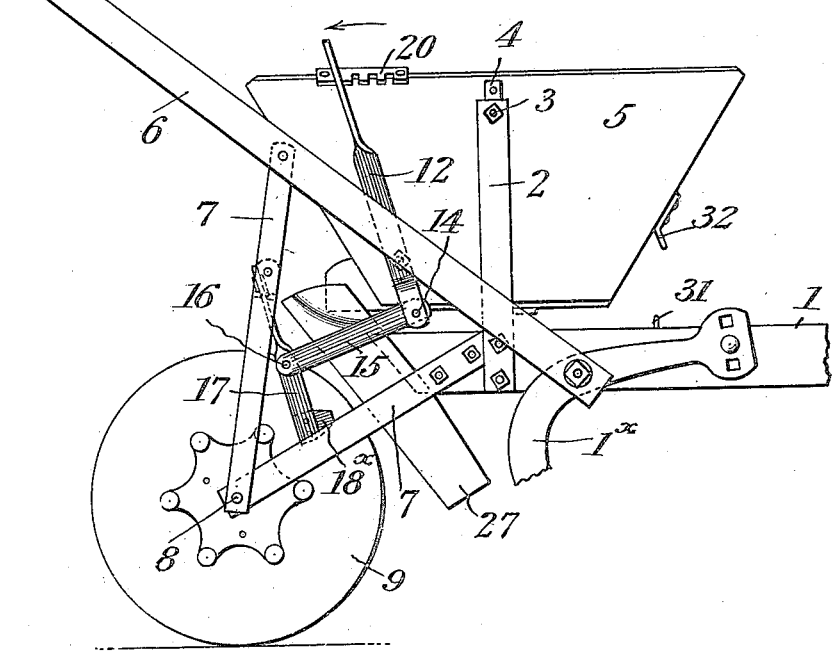

I illustrate my invention in the accompanying drawings, in which:

Figure 1 is a side elevation of my invention showing the apparatus adjusted for its maximum vibratory movement. Fig. 2 is a similar view showing the vibratory apparatus automatically thrown out of gear and Fig. 3 is a side elevation showing the apparatus permanently held in inoperative position.

Reference now being had to the details of the drawings by numeral, 1 designates a beam having a scoop plow 1× secured thereto, and 2 designate bars which are fastened to the opposite sides of the beam and which are apertured for the reception of the pivotal bolts 3 which are fastened to the plates 4, one upon either side of the hopper 5. Suitable handles 6 are fastened to the beam and to said handles are secured the ends of the bars 7 which in turn carry the axle 8 upon which the wheel 9 is journaled. A plate 10 is fastened to the face of the wheel and has lugs 11 projecting therefrom at intervals. An operating handle 12 is pivotally mounted upon a bolt 13 and has connection through the medium of the pivot 14 with a bar 15 which in turn is pivotally connected at 16 to a member 17 which has a longitudinal movement through a slot 18 formed in the cross piece 19 which is fastened to the two oppositely disposed bars 7. A projection 35 upon the member 17 serves to limit the downward movement of the latter. Said member 17 has a plate 18× secured to its lower end and projecting laterally therefrom and which is adapted, when the member is thrown to the position shown in Fig. 1, to be in the path of said lugs 11 for the purpose of tilting the member to the position shown in dotted lines in Fig. 1 when the wheel 9 rotates. A segment plate 20 is fastened horizontally to the upper edge of the hopper and the free end of the handle 14 is designed to engage one or another of the notches, accordingly as it may be desired to regulate the vibratory movement to be imparted to the hopper or to throw the apparatus out of operative position when adjusted as shown in Fig. 3 of the drawings.

A spring 30 is fastened at one end to an eye 31 upon the frame and its other end to a bar 32 which is fastened to the end of the hopper, the purpose of said spring being to cause the hopper to return to its normal position after having been tilted by the rotary movement of the wheel 9.

The operation of my invention will be readily understood and is as follows:— When the apparatus is set in the manner shown in Fig. 3 of the drawings, it will be apparent that the distributer may be moved backward or forward without the hopper being agitated. When it is desired to cause the hopper to be agitated for the purpose of shaking the fertilizer or seed therefrom, the handle 12 may be adjusted in one or another of the forward notches. For instance, when the handle is adjusted in the forward notch of the series in the plate 20, the maximum vibratory movement will be imparted to the hopper as the wheel rotates forward in the direction of the arrow in Fig. 1, thus causing the fertilizer or seed to be shaken through into the trough and thence to the ground. Should a more moderate vibratory movement be desired, the handle may be adjusted in one of the notches intermediate the end ones to correspondingly regulate the movement of the hopper. In the event of the apparatus being moved backward or in the direction indicated in the arrow in Fig. 2, the end of the member 17 coming in contact with the lug 11 will be thrown to the position shown in Fig. 2 of the drawings and the hopper will be automatically held from vibration and, when the handle is thrown to position shown in Fig. 3, the apparatus is out of operative relation.

What I claim to be new is:—

A guano distributer and seed drill comprising a beam, handles secured thereto, braces secured to the beam and handle, a shaft journaled in said braces, a wheel mounted upon said shaft and having tappets projecting from the face thereof, a vibrating hopper upon the beam, a slotted cross-piece mounted upon two of said braces, a longitudinally movable bar passing through said slotted cross-piece, means for limiting the downward movement of said bar, a lug projecting from the lower end of the bar and adapted to be thrown into the path of said tappets, a lever pivotally mounted upon the hopper, and pivotal link connections between said lever and longitudinally movable bar.

In testimony whereof I hereunto affix my signature in presence of two witnesses.

CLAUDE HENNESSEE.

Witnesses:
W. L. DAUGHTY,
J. D. McCLURE.

Copies of this patent may be obtained for five cents each, by addressing the "Commissioner of Patents, Washington, D. C."